United States Patent [19]

Lang, Jr.

[11] 3,760,494

[45] Sept. 25, 1973

[54] MAGNETIC HEAD ASSEMBLY

[75] Inventor: Alphonse Gregory Lang, Jr., West Caldwell, N.J.

[73] Assignee: Ceramic Magnetics, Inc., Fairfield, N.J.

[22] Filed: Sept. 8, 1971

[21] Appl. No.: 178,742

Related U.S. Application Data

[62] Division of Ser. No. 7,698, Feb. 2, 1970, Pat. No. 3,655,923.

[52] U.S. Cl. .......................... 29/603, 179/100.2 C

[51] Int. Cl. .......................... G11b 5/42, H01f 7/06

[58] Field of Search .................. 29/603; 179/100.26; 340/174.1 F; 346/74 MC

[56] References Cited

UNITED STATES PATENTS

| | | | |
|---|---|---|---|
| 3,613,228 | 10/1971 | Cook et al. | 29/603 |
| 3,601,871 | 8/1971 | Pierce | 29/603 |
| 3,478,340 | 11/1969 | Schwartz et al. | 179/100.2 C X |
| 3,126,615 | 3/1964 | Duinker | 29/603 |
| 3,543,396 | 12/1970 | Illg et al. | 29/603 |

*Primary Examiner*—Charles W. Lanham
*Assistant Examiner*—Carl E. Hall
*Attorney*—Lane, Aitken, Dunner & Ziems

[57] ABSTRACT

A method of manufacturing a magnetic head assembly wherein a pair of unitary body members, each made up of a plurality of alternating layers of magnetic material and spacer material, are joined along two surfaces by means of a gapping material, and a third unitary body member is applied to said pair of body members. The third body member has layers of magnetic material registering with the layers of magnetic material of the other body members to provide a plurality of separate paths for magnetic flux.

1 Claim, 7 Drawing Figures

INVENTOR.
ALPHONSE G. LANG, Jr.

INVENTOR.
ALPHONSE G. LANG, Jr.

MAGNETIC HEAD ASSEMBLY

CROSS-REFERENCE TO RELATED APPLICATION

This application is a division of copending application Ser. No. 7,698, filed Feb. 2, 1970 now U.S. Pat. No. 3,655,923.

BACKGROUND OF THE INVENTION

This invention relates to a method of manufacturing a magnetic head assembly, and more particularly, to a method of manufacturing a magnetic head assembly having a plurality of spaced layers of magnetic material, each defining a magnetic gap for utilization in a magnetic recording process.

The normal procedure for manufacturing a multi-track recording head assembly is to fabricate each individual head from either a pair of "C" cores or a "C" and an "I" core. A coil of wire is then wound around each head, and the heads are placed within a plurality of slots provided in a carrier block. Further operations are then required to smooth the various critical surfaces of the assembly, so that all parts of the assembly will be in proper alignment.

Since each assembly may consist of twenty or more heads assembled in the above manner and, in turn, each individual head comprises a minimum of two and possibly three parts, the amount of handling required, as well as the finishing operation, are prohibitive to high speed, efficient production. Moreover, it is most important for interchangeability purposes to have the spacing of the slots in the carrier block accurate to a very fine tolerance, so that the individual heads will register accurately along the recording medium. As a result, all parts must be machined individually with extreme accuracy. Further, since each gap is defined individually, it is extremely difficult to achieve a uniform gap alignment between the individual heads.

SUMMARY OF THE INVENTION

It is, therefore, an object of the present invention to provide a method of manufacturing a magnetic head assembly of the above type in which the assembly operation is greatly simplified due to a reduction in the number of individual parts involved.

It is a further object of the present invention to provide a method of manufacturing a magnetic head assembly of the above type in which final machining operations are minimized.

It is a still further object of the present invention to provide a method of manufacturing a magnetic head assembly having a uniform gap alignment.

Towards the fulfillment of these objects, the method of the present invention comprises the steps of forming a block of alternating layers of magnetic material and spacer material, slicing said block to form two unitary body members each having said alternating layers of magnetic material and spacer material, and joining the two surfaces of said body members formed as a result of said slicing by means of a gapping material to form a gap between said body members.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
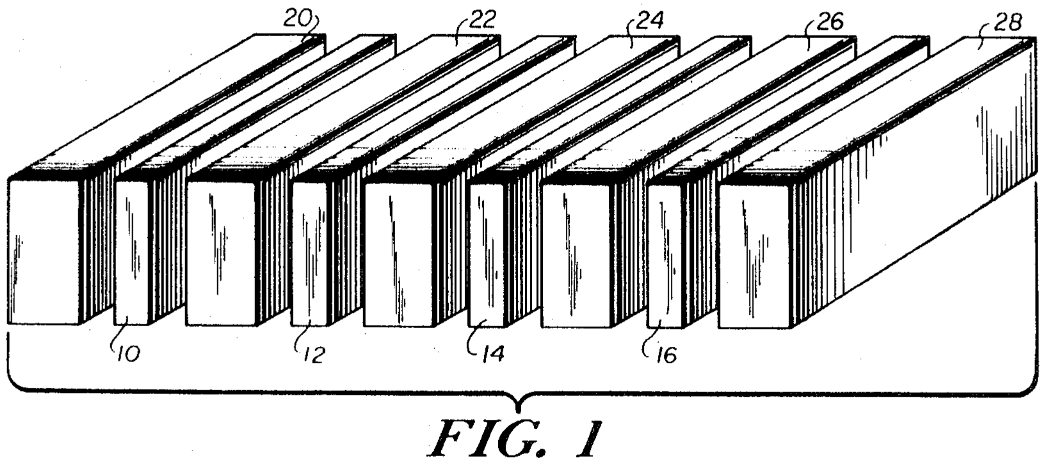
FIG. 1 is a perspective view of a plurality of slabs of magnetic and non-magnetic material which make up a portion of the head assembly manufactured according to the method of the present invention.

Referring specifically to FIG. 1 of the drawing, a plurality of slabs are shown in a spaced position, and consist of slabs 10, 12, 14, and 16 of a magnetic material such as ferrite, and slabs 20, 22, 24, 26, and 28 of a spacer material such as alumina ceramic. The slabs 10, 12, 14, and 16 may be formed from a single, larger slab (not shown) by slicing the latter along three equally spaced parallel lines, and the slabs 20, 22, 24, 26, and 28 may be formed in the same manner from a larger slab of ceramic material.

Figures 2, 3:
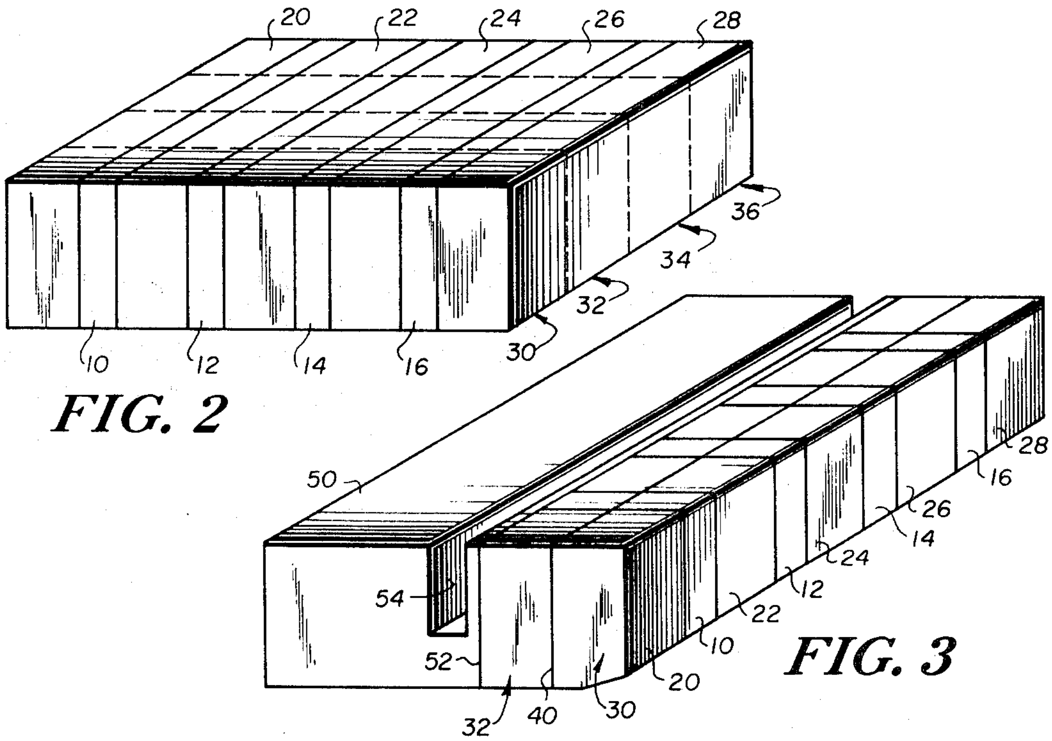
FIG. 2 is a perspective view showing the slabs of FIG. 1 after they have been assembled.
FIG. 3 is a perspective view of a pair of block members which have been cut from the unit of FIG. 2 and assembled to a carrier block.

The slabs shown in FIG. 1 are assembled and cemented together to form a unitary body shown in FIG. 2, with the slabs 10, 12, 14, and 16 alternately disposed between the slabs 20, 22, 24, 26, and 28. The unitary body thus formed is then sliced along the planes shown by the dashed lines in FIG. 2 to form a plurality of individual blocks 30, 32, 34, and 36.

Each individual block 30, 32, 34, and 36 is then finely ground, lapped, and polished, and according to the particular example, two of the blocks, such as blocks 30 and 32, are adhered back together along the surfaces thereof formed as a result of the previous slicing. This can be achieved by use of an adhesive material, such as an epoxy or glass, which serves both as a bonding agent and as a spacer material and defines a "gap" shown by the reference numeral 40 in FIG. 3. A metallic gapping material may also be used with the adhesive material, if desired.

As shown in FIG. 3, the unit comprising the blocks 30 and 32 is attached to a carrier block 50 along a junction line 52 in conventional manner, such as by bonding. The carrier block 50 is provided with a notch 54 therein in order to facilitate assembly into a computer or other similar equipment. Of course, the blocks 34 and 36 may be gapped, bonded, and attached to another carrier block in the same manner.

Figure 4:
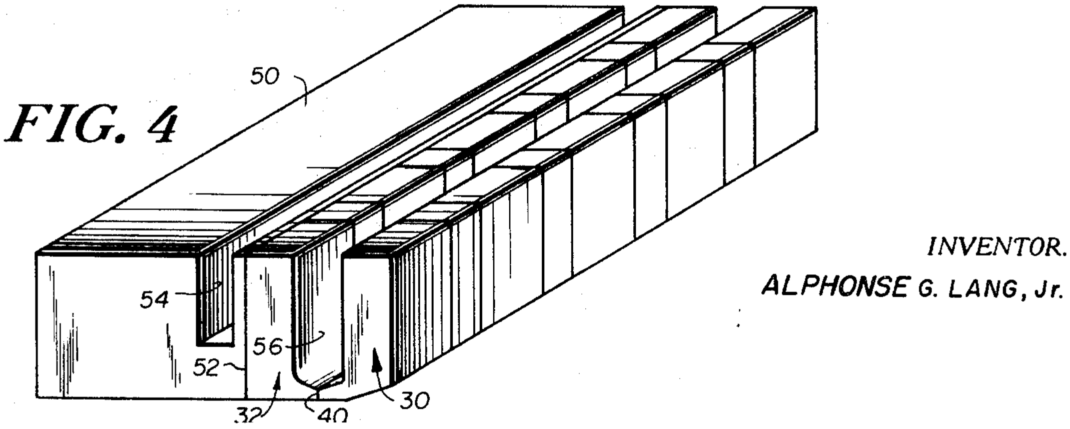
FIG. 4 is a view similar to FIG. 3 but showing the unit after it has been form ground.

As shown in FIG. 4, a window 56 is formed in the blocks 30 and 32 by grinding. This forms the cross-sectional configuration of the individual heads, with each having a gap 40.

Figure 5:
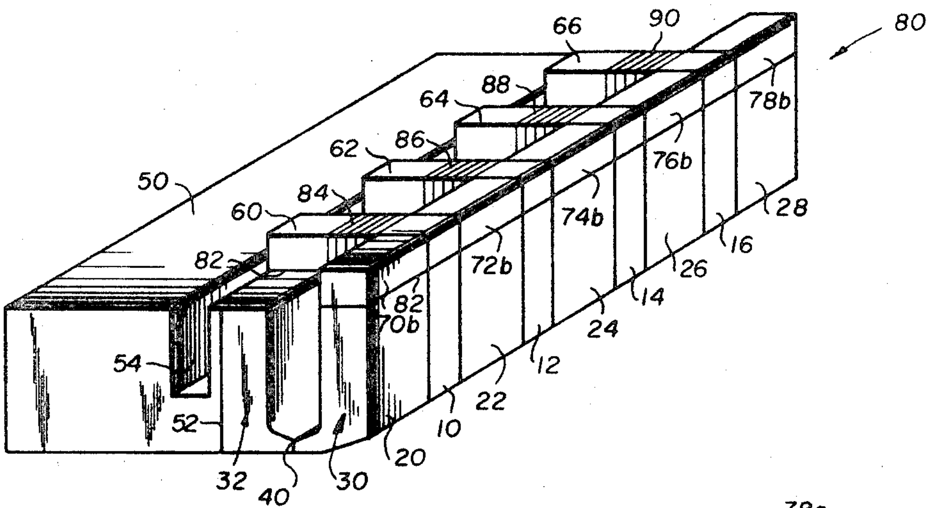
FIG. 5 is a view similar to FIGS. 3 and 4, but showing an additional unit mounted on the unit of FIGS. 3 and 4.
Figure 6:
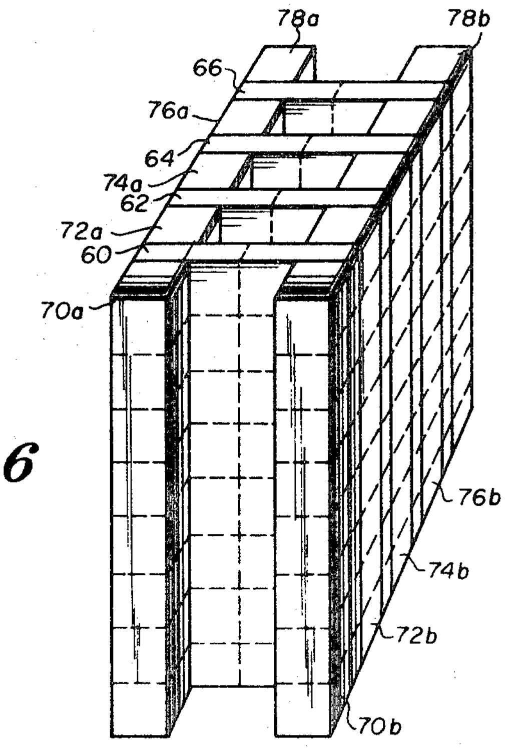
FIGS. 6 and 7 are perspective views showing a laminated assembly from which the additional unit of FIG. 5 is manufactured.
Figure 7:
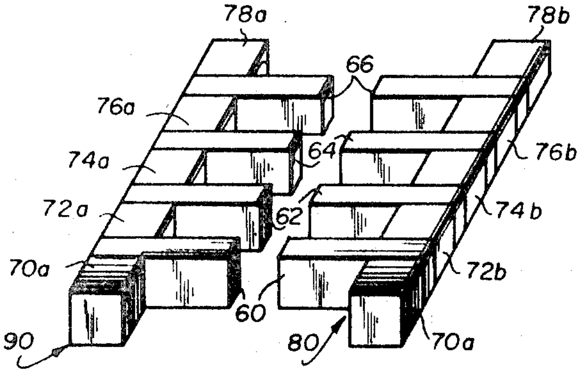

After the window 56 is formed, an additional block 80 is then fitted onto the unit formed by the blocks 30 and 32 along the junction lines 82, as shown in FIG. 5. The manner in which the block 80 is formed is shown in FIGS. 6 and 7. Specifically, a plurality of slabs 60,

62, 64, and 66, of a ferrite material, are arranged between a plurality of spacers 70a and 70b, 72a and 72b, 74a and 74b, 76a and 76b, and 78a and 78b, and the resulting assembly bonded together. The assembly thus formed is then sliced in two directions along the dashed lines shown in FIG. 6, forming a plurality of individual units, two of which are shown by the reference numerals 80 and 90 in FIG. 7. It is noted that a portion of each of the slabs 60, 62, 64, and 66 projects from its respective spacer member.

A plurality of coiled conductors 84, 86, 88, and 90, shown in FIG. 5, are then placed over the projecting portions of the slabs 60, 62, 64, and 66, respectively, before assembly of the unit 80 to the unit formed by the blocks 30 and 32.

The assembly shown in FIG. 5 is thus complete, and may be positioned in a housing, or the like, along with the various associated components, and a magnetic tape or similar recording medium transported in a direction from left to right as viewed in FIG. 5, will pass over all four tracks formed by the gaps 40 of the slabs 10, 12, 14, and 16. Of course, it is understood that in the event a six or eight track system, or any multiple thereof, is desired, the above number of slabs, spacers, etc. would be increased accordingly.

It can be appreciated that, since the operator need handle only two basic parts, the assembly of the magnetic head according to the present invention is relatively simple. Also, by forming and laminating the magnetic and non-magnetic parts together in the above manner, each head has a uniform thickness, and precise fitting tolerances of the individual parts forming the heads are eliminated. Further, with the proper attention to the dimensional sizes of the laminated sections, the registration and accuracy from track to track and gap to gap will be measurably more accurate than can be attained in the manufacture of the prior art assemblies, as discussed above. Also, the coiled conductors can be pre-wound and formed on automatic machinery, such as a bobbin-winder, and merely dropped into place on the projecting portion of the slabs of the unit 80, thus eliminating hand winding directly onto the cores of the heads.

It is further noted that by machining the slabs 60, 62, 64, and 66 to a relatively large thickness, the registration of these slabs with the slabs 10, 12, 14, and 16 is less critical. For example, the slabs 10, 12, 14, and 16 may be 0.015 ± 0.0005 in. thick, while the slabs 60, 62, 64, and 66 may be 0.018 ± 0.0005 in. thick so that the magnetic flux path will be completed even though the slabs are misregistered by as much as 0.002 in. It is also noted that the height of the block 80, as viewed in FIG. 5, may be increased to increase the physical strength of the assembly, without affecting the magnetic properties of the heads to any significant degree.

Of course, it can be appreciated that the configuration of the particular assembly disclosed above may be varied without departing from the scope of the method of the present invention. For example, the location of the window 56 on the unit formed by the blocks 30 and 32 can be varied to allow assembly of the return path from the side rather than from the top, as viewed in FIG. 5.

Of course, other variations of the method of manufacturing a magnetic head assembly disclosed above can be made by those skilled in the art without departing from the invention as defined in the appended claims.

I claim:

1. A method of manufacturing a magnetic head assembly comprising the steps of forming a block of alternating layers of magnetic material and spacer material, slicing said block to form two unitary body members each having said alternating layers of magnetic material and spacer material, joining the two surfaces of said body members formed as a result of said slicing by means of a gapping material to form a gap between said body members, removing a portion of each of said two body members along a portion of the surfaces joined by said gapping material to form a space between corresponding portions of said body members, forming a third unitary body member having alternating layers of magnetic material and spacer material and portions of its layers of magnetic material projecting from its layers of spacer material, placing a pre-formed coiled conductor over each of said projecting portions, and then securing said third body member relative to at least one of the other body members in a manner so that the layers of magnetic material and spacer material of said third body member respectively register with the layers of magnetic material and spacer material of said two body members, and so that said projecting portions extend across said space.

* * * * *